Aug. 16, 1960
F. H. CLOTHIER
2,949,094
VISUAL AIRCRAFT FINDER
Filed Feb. 20, 1958
3 Sheets-Sheet 1
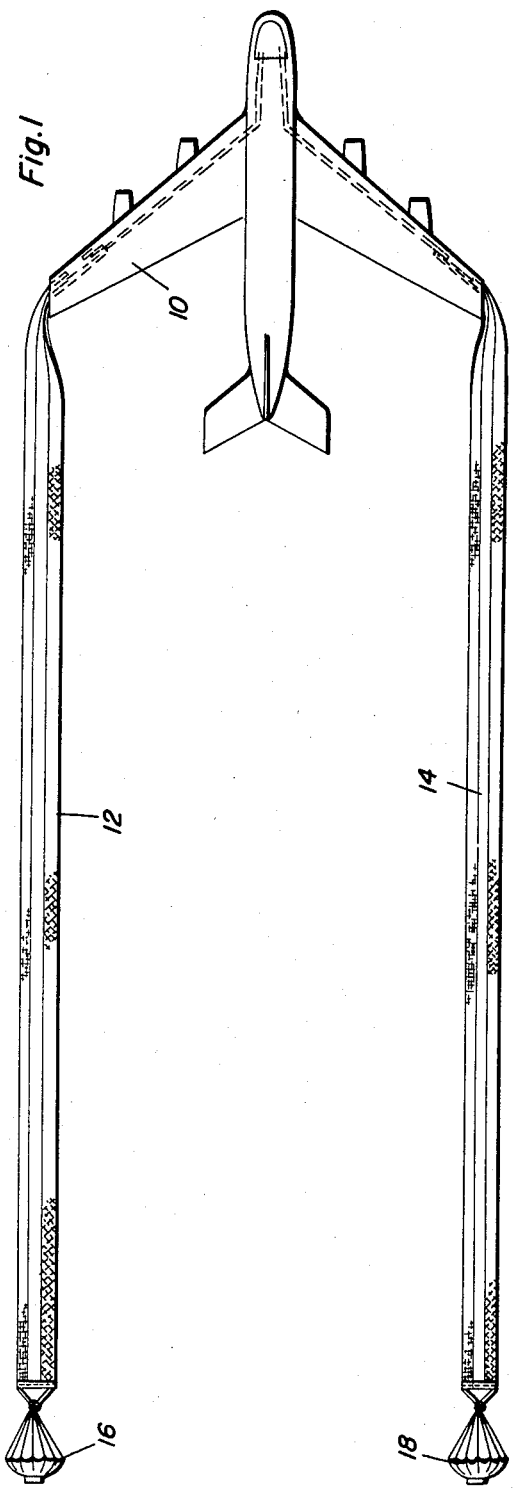
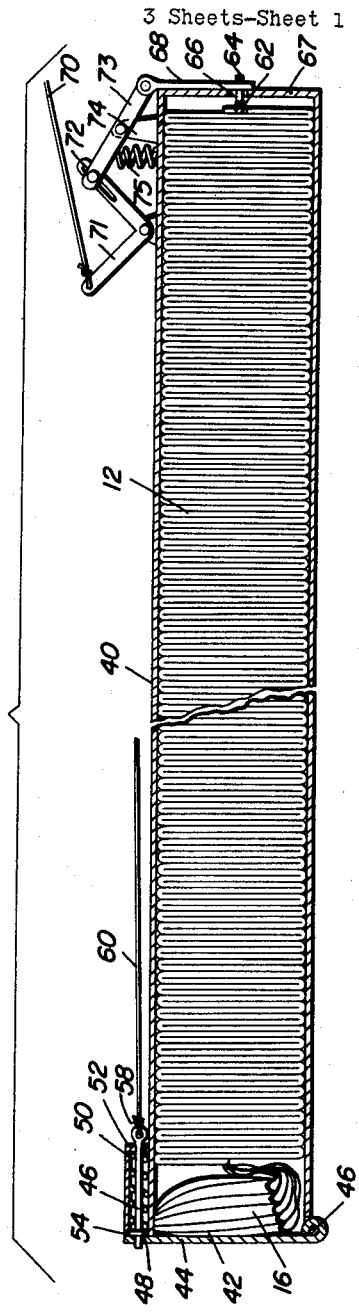
Fred H. Clothier
INVENTOR.
BY *Clarence A. O'Brien*
*and Harvey B. Jacobson*
Attorneys Aug. 16, 1960   F. H. CLOTHIER   2,949,094
VISUAL AIRCRAFT FINDER
Filed Feb. 20, 1952   3 Sheets-Sheet 2
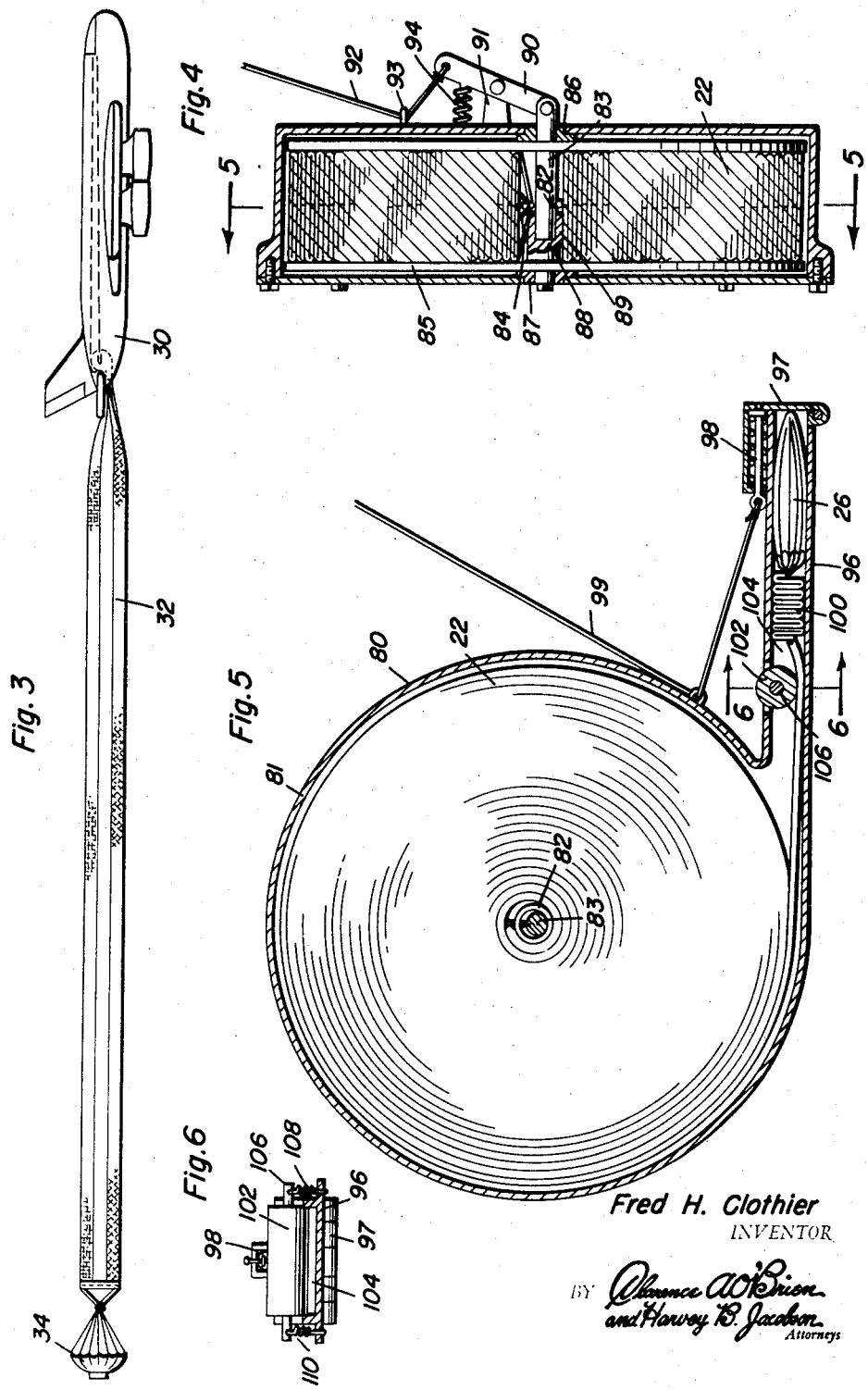
Fred H. Clothier
INVENTOR
BY Clarence A. O'Brien
and Harvey B. Jacobson
Attorneys Aug. 16, 1960  F. H. CLOTHIER  2,949,094
VISUAL AIRCRAFT FINDER
Filed Feb. 20, 1958  3 Sheets-Sheet 3
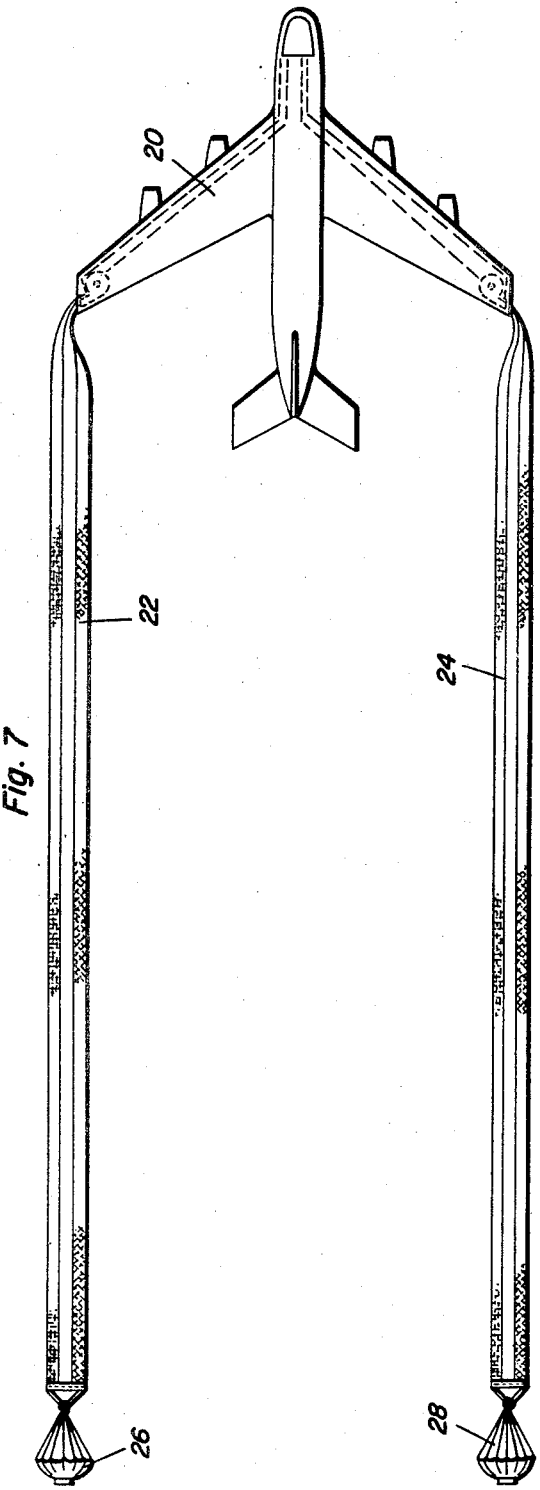
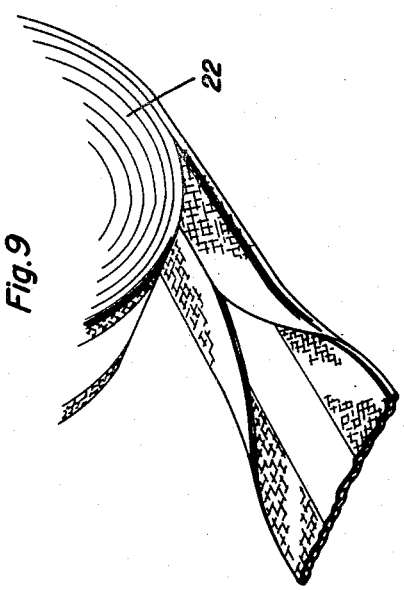
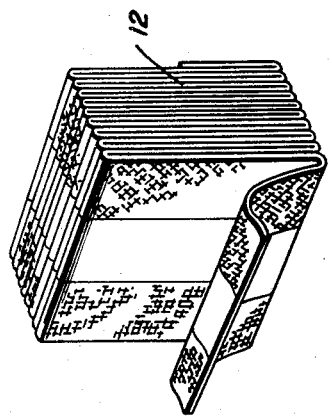
Fred H. Clothier
INVENTOR.

United States Patent Office 2,949,094
Patented Aug. 16, 1960

2,949,094

VISUAL AIRCRAFT FINDER

Fred H. Clothier, Route 1, Corinth, N.Y.

Filed Feb. 20, 1958, Ser. No. 716,346

6 Claims. (Cl. 116—124)

This invention relates to equipment for detecting aircraft that has been required to land in regions which are not ordinarily traversed.

This invention entails a safety device that may be used with all types of aircraft from the largest to the smallest or the slowest to the fastest. It can be placed in the wing or fuselage or at any other place on the aircraft where it may serve the intended purpose.

When an aircraft is in trouble over either land or water, it is only necessary to pull a button to release a very large banner. A small sock, parachute, etc., is attached to the outer end of the banner and as soon as the pilot releases the banner, the wind sock, parachute or the like is ejected into the windstream causing it to pull the banner out.

The banner is very long and wide and is strung along the ground or on the water to provide a very large inspection area to aid rescue parties to find the downed airplane by inspection.

An object of the invention is to provide a new and improved structure for storing and ejecting a comparatively large banner to serve the above described purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of an airplane showing an arrangement with two banners being strung from the wing tips.

Figure 2 is a longitudinal sectional view of the tube type storage compartment for the banner, this type being used in the airplane of Figure 1.

Figure 3 is a small scale elevational view of an airplane showing the banner being strung out from the aft end of the fuselage and by being paid out of a modification of the compartment.

Figure 4 is a sectional view of a reel type holder for the banner, the reel type holder enclosing a compartment wherein the banner is stored during ordinary operations of the airplane.

Figure 5 is a sectional view taken on the line 5—5 of Figure 4.

Figure 6 is a sectional view taken on the line 6—6 of Figure 5.

Figure 7 is a top view of an airplane showing two banners being dispensed from reel type holders at the wing tips of the airplane.

Figure 8 is a fragmentary perspective view showing the folding of the banner suggested for the compartment in Figure 2.

Figure 9 is a fragmentary perspective view showing the rolled banner as it would appear in the holder of Figure 4.

In the accompanying drawings there is an airplane 10 showing one of many possible applications of the principles of the invention. This airplane has two banners 12 and 14 and these are shown streaming from the banner holders in the wings and at the wing tips. Banners 12 and 14 have been ejected by the pilot and are held strung up behind the aircraft by two small parachutes 16 and 18. The parachutes may be substituted by wind socks or some other means of applying a braking action to the outer ends of the banners as soon as they are ejected and enter the slipstream. All of the banners of the invention are each made of lightweight material, for example silk, nylon, certain types of paper. It is preferred that the material be water repellant so that it floats on the surface of water for a long time.

Figure 7 shows an airplane 20 with banners 22 and 24. These have small parachutes 26 and 28 at their outer ends. The only difference between the embodiments of Figures 1 and 7 is found in the holders for the banners. Figure 3 shows an airplane 30 that has a pair of banners, only one banner 32 of which is illustrated. It has a small parachute 34 at its outer end just as the unshown banner of Figure 3. The distinction between Figure 3 and Figure 1 and Figure 7 is in the location of the holder for the banner. It is at the aft part of the fuselage. These three figures show that it is contemplated to apply the holders at any number of places on aircraft. The operation and purpose of each banner remains the same. To further facilitate easy inspection of the banner after it is used, it is preferred that the banner be luminous as by painting.

Reference is now made to the holder of Figure 2. This holder has banner 12 in it and the banner is folded upon itself in a progressive fashion. Holder 12 has the construction of a casing 40 with one end 42 open. Door 44 is mounted on hinge 46 and is adapted to swing from the closed to the opened position. After packing the banner 12 in casing 40 with parachute 16 against door 44, the safety device is ready to be used. The door 44 is held closed by a latch 46 whose outer end is passed through an opening 48 in the door 44. The latch is held pressed in the closed position by means of spring 50 that reacts on a wall of the latch supporting housing 52 on casing 40 and against a collar 54 that is fixed to the rod that constitutes latch 46. An eye 58 is at the outer end of latch 46 and has a pull cable 60 connected to it. This cable goes to the cock pit or pilot's quarter and is operatively connected with a push button, pull cord or any other means to operate the cable. When the cable 60 is pulled, the inherent compression of the banner forces it out slightly with the parachute becoming very quickly caught in the windstream and thereby pulling the banner up very rapidly and with great certainty.

The inner end of banner 12 has an eye 62 attached to it. This eye is engaged with a ring 64 that passes through an opening 66 in the end wall 67 of casing 40. Rod 68 extends through the ring 64 and is on the outside of wall 67. This holds the ring 64 separably fastened to the casing. Therefore the banner will remain attached to the airplane until such time that rod 68 is withdrawn from ring 64. Release cable 70 under the control of the pilot or co-pilot or some other crew member, is attached to a bell crank 71 carried pivotally by casing 40 and this is pivoted by a slot and pin connection 72, to the rocker 73. Rocker 73 is mounted for oscillation on a pivot that is carried by bracket 74, this also supported by casing 40. A pivot pin can be used for attaching the outer end of rocker 73 to the rod 68. Spring 75 is interposed between rocker 73 and a surface of the casing 40. This spring applies a yielding bias to the rocker in a direction tending to retain the rod engaged with ring 64. Therefore when withdrawing rod 68 it must be by a positive force applied in a direction which is yieldingly opposed by spring 75.

Reference is now made principally to Figures 4, 5, 6 and 9. Holder 80 that is depicted in these figures is shown in use in airplanes 20 and 30. The holder is made of a casing 81 that is preferably circular to accommodate the roll of banner 22. As shown in Figure 9 the banner is prepared by longitudinally folding so that it occupies a minimum thickness. The inner end of the banner has a structure that corresponds to the means described for releasably retaining the inner end of banner 12. This structure consists of a ring 82 engaged around rod 83. A second ring or eye or corresponding means 84 is provided to fasten the inner end of the banner to ring 82. Reel 85 is mounted for rotation in bearings 86 and 87 that are diametrically opposed in casing 80. Hub 88 of the reel has an opening 89 within which the inner end of rod 83 is disposed. Since ring 82 is on rod 83, if the spindle is withdrawn from hub 88, the ring 82 can be and is released thereby enabling banner 22 to be separated from casing 80.

The rod 83 has its outer end pivoted to rocker 90, the latter being carried on a pivot that is attached to mounting bracket 91 of the wall of casing 80. The opposite end of the rocker has a pull cable 92 attached to it and is guided by an eye 93 on casing 80. Spring 94 reacts on the casing and rocker 90 and functions in the manner identical to spring 75. Cable 92 is under the control of aircraft personnel.

The outer end of the banner 22 has its parachute in a portion 96 of casing 80 which constitutes the discharge end thereof. Door 97 identical in function to door 44, is hinged to the casing portion 96 that is held releasably locked in the closed position by a latch 98. This latch has a control cable 99 secured to it for operation identical to the operation of latch 46. The latches 46 and 38 are the same.

A quantity 100 of banner 22 is stored in portion 96 and this quantity is folded just as banner 12 (Figure 8). It is to provide sufficient slack to allow parachute 26 to get well into the airstream before the reel 85 has to unroll to pay out the banner. A drag adjustment for the banner in the form of presser roll 102 is carried in portion 96 in advance of supply. Roll 102 extends transversely across the passageway 104 defined by portion 96 and has an axle 106 extending through it. Springs 108 and 110 are attached to the ends of the axle (Figure 6) and to flanges on the portion 96. These apply a spring load in a direction and on roller 102 which tends to compress the banner against the bottom surface of the passageway 106 as it is being withdrawn from casing 80.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and changes may be resorted to, falling within the scope of the invention as claimed.

What is claimed as new is as follows:

1. For use on an aircraft, a visual aircraft finder comprising the combination of a banner that has an inner end and an outer end, a holder carried by the aircraft and within which the banner is stored, means releasably holding the outer end of the banner is the holder, the last mentioned means having a control structure under the control of the aircraft personnel, and means releasably retaining the inner end of the banner in place on said holder, said inner end of said banner having a ring secured thereto, said means releasably retaining the inner end of the banner on said holder including a rod reciprocably movably mounted on said holder in alignment with said ring, spring means normally biasing said rod to a position extending through said ring, and cable means operatively connected to said rod and extending to a point remote therefrom acting in opposition to said spring whereby said rod may be withdrawn from said ring so as to separate said banner from said holder.

2. A visual aircraft finder comprising the combination of a casing, a banner of flexible material, a reel on which said banner is wound, said banner having an outer end, a portion of said casing having a passageway within which said outer end of said banner is stored, said outer end of said banner having a quantity which is folded in said passageway, a parachute at the outer end of said quantity of banner, means for attaching the inner end of said banner within said casing, a door at the outer end of said passageway, and means for releasing said door to open said passageway and through which the parachute and quantity of said banner are adapted to pass.

3. A visual aircraft finder comprising the combination of a casing, a banner of flexible material, a reel on which said banner is wound, said banner having an outer end, a portion of said casing having a passageway within which said outer end of said banner is stored, said outer end of said banner having a quantity which is folded in said passageway, a parachute at the outer end of said quantity of banner, means for attaching the inner end of said banner within said casing, a door at the outer end of said passageway, means for releasing said door to open said passageway and through which the parachute and quantity of said banner are adapted to pass, and a drag producing and banner guiding roller carried by said casing and located in said passageway and against which the banner is adapted to contact when it is being drawn through said passageway.

4. The visual aircraft finder of claim 3 wherein said means for retaining the inner end of said banner in said casing comprise a ring, means securing said ring to said inner end of said banner, and means releasably holding said ring in a fixed position within said casing.

5. The visual aircraft finder of claim 3 wherein said means for retaining the inner end of said banner in said casing comprise a ring, means securing said ring to said inner end of said banner, and means releasably holding said ring in a fixed position within said casing, said ring retaining means including a spindle, said ring concentrically arranged on said spindle and separable from said spindle when said spindle is withdrawn from said ring.

6. A visual aircraft finder comprising the combination of an elongated casing, a folded banner in said casing extending the length thereof, a parachute on the outer end of said casing, said casing having a discharge opening, a door operable over said opening, a latch carried by said casing and in engagement with said door to releasably hold said door in the closed position, means operable remote from the casing for actuating said latch, and means for releasably holding the inner end of said banner fastened to said casing, said means holding said inner end of said banner releasably fastened to said casing including a ring that is attached to said banner, a rod passed through said ring and contacting a part of said casing and thereby retaining said ring fastened in place, and means operable remote from said ring for actuating said rod.

References Cited in the file of this patent

UNITED STATES PATENTS

| | | |
|---|---|---|
| 1,805,002 | Neumeyer | May 12, 1931 |
| 2,134,987 | Shorb | Nov. 1, 1938 |
| 2,183,540 | Campbell | Dec. 19, 1939 |
| 2,238,875 | Manson | Apr. 15, 1941 |
| 2,825,803 | Newbrough | Mar. 4, 1958 |